United States Patent Office 3,197,523
Patented July 27, 1965

3,197,523
DEALKYLATION OF ALKYLAROMATIC
COMPOUNDS
Edward Michalko, Chicago, and Richard E. Rausch,
Wheeling, Ill., assignors to Universal Oil Products Company, Des Plaines, Ill., a corporation of Delaware
No Drawing. Filed Nov. 3, 1961, Ser. No. 149,890
7 Claims. (Cl. 260—672)

This application relates to a process for the dealkylation of alkyl substituted aromatic compounds. More particularly the invention is concerned with a process for hydrodealkylating alkyl substituted aromatic hydrocarbons in the presence of a catalytic composition of matter.

In recent years the use of aromatic hydrocarbons such as benzene and naphthalene has greatly increased. For example, benzene of a high grade purity is used as an intermediate in the preparation of styrene monomer which may be polymerized to form a type of rubber. Also benzene is used as an intermediate in the preparation of phenol, aniline, maleic anhydride, insecticides such as DDT and benzene hexachloride, and as intermediates in the preparation of synthetic fibers such as some types of nylon. Another relatively important use of benzene is as an intermediate in the preparation of detergents such as alkyl-aromatic sulfonates. These latter compounds are prepared by alkylating benzene with a long chain polymer containing from about 12 to about 15 carbon atoms or more in the chain. Following the alkylation of the benzene the resultant compound may be sulfonated by any method well known in the art to produce the corresponding sulfonic acids. These acids may then be neutralized by any basic material such as sodium hydride, potassium hydride, etc., to form the corresponding sulfonates such as sodium or potassium salt of the alkyl-aromatic sulfonic acid. Furthermore, naphthalene also finds a wide variety of uses in the chemical field as an intermediate in the preparation of such compounds as phthalic anhydride.

In view of this increased use of aromatic compounds of a relatively high degree of purity the present process is concerned with a method of preparing the same and involves the introduction of an alkylaromatic compound and particularly an alkylaromatic hydrocarbon into a hydrodealkylation zone wherein said hydrocarbon is contacted with hydrogen in the presence of a catalyst whereby the alkylaromatic hydrocarbon is hydrodealkylated to form the desired alkylaromatic hydrocarbon, the process being described in greater detail in the specification. The catalytic composition of matter which is utilized in the present process differs from catalytic compositions of matter which have heretofore been utilized and the use of said catalyst will result in obtaining a greater yield of the desired product than heretofore has been accomplished.

It is therefore an object of this invention to provide a process for the hydrodealkylation of alkyl substituted aromatic compounds.

A further object of this invention is to provide a process for the hydrodealkylation of alkylaromatic hydrocarbons to the action of hydrogen in the presence of a novel catalytic composition of matter thereby obtaining the desired aromatic hydrocarbon in greater quantities.

Taken in its broadest aspect one embodiment of this invention resides in a method for the hydrodealkylation of an alkylaromatic compound which comprises passing an alkylaromatic compound to a dealkylation zone containing a catalyst which has been prepared by commingling a compound containing a metal of Group IV of the Periodic Table with a refractory oxide, calcining the resultant base, and thereafter impregnating said base with an oxide of a metal of Group VIB of the Periodic Table, hydrodealkylating said alkylaromatic compound in the presence of hydrogen and said catalyst at hydrodealkylating conditions, and recovering the desired aromatic compound.

A further embodiment of the invention is found in a method for the hydrodealkylation of an alkylaromatic hydrocarbon which comprises passing an alkylaromatic hydrocarbon to a dealkylation zone containing a catalyst which has been prepared by commingling a compound containing a metal of Group IV of the Periodic Table with a refractory oxide, calcining the resultant base, and thereafter impregnating said base with an oxide of a metal of Group VIB of the Periodic Table, hydrodealkylating said alkylaromatic hydrocarbon in the presence of hydrogen and said catalyst at a temperature in the range of from about 1000° to about 1500° F. and at a pressure in the range of from about 300 to about 1000 pounds per square inch, removing reactor effluent from said dealkylation zone, passing said reactor effluent to a high pressure separator wherein said effluent is separated into a hydrogen-rich gaseous fraction and a liquid hydrocarbon fraction, recycling said hydrogen-rich gaseous fraction to said dealkylation zone, passing said liquid hydrocarbon fraction to a low pressure separator, removing light hydrocarbons, recycling one portion of the remaining liquid hydrocarbon fraction to said dealkylation zone, recycling a second portion of said liquid fraction to admix with said reactor effluent prior to entry into said high pressure separator, removing the remaining portion of said liquid hydrocarbon fraction, fractionating said latter portion, and recovering the desired aromatic hydrocarbon.

Yet another embodiment of the invention is found in a method for the hydrodealkylation of an alkylaromatic hydrocarbon which comprises passing an alkylaromatic hydrocarbon to a dealkylation zone containing a catalyst which has been prepared by commingling stannic chloride with a refractory oxide, calcining the resultant base, and thereafter impregnating said base with an oxide of a metal of Group VIB of the Periodic Table, hydrodealkylating said alkylaromatic hydrocarbon in the presence of hydrogen and said catalyst at a temperature in the range of from about 1000° to about 1500° F. and at a pressure in the range of from about 300 to about 1000 pounds per square inch, removing reactor effluent from said dealkylation zone, passing said reactor effluent to a high pressure separator wherein said effluent is separated into a hydrogen-rich gaseous fraction and a liquid hydrocarbon fraction, recycling said hydrogen-rich gaseous fraction to said dealkylation zone, passing said liquid hydrocarbon fraction to a low pressure separator, removing light hydrocarbons, recycling one portion of the remaining liquid hydrocarbon fraction to said dealkylation zone, recycling a second portion of said liquid fraction to admix with said reactor effluent prior to entry into said high pressure separator, removing the remaining portion of said liquid hydrocarbon fraction, fractionating said latter portion and recovering the desired aromatic hydrocarbon.

A specific embodiment of the invention resides in a method for the hydrodealkylation of toluene which comprises passing toluene to a dealkylation zone containing a catalyst which is prepared by commingling stannic chloride with alumina, calcining the resultant base, and thereafter impregnating said base with chromia, hydrodealkylating said toluene in the presence of hydrogen and said catalyst at a temperature in the range of from about 1000° to about 1500° F. and at a pressure in the range of from about 300 to about 1000 pounds per square inch, removing reactor effluent from said dealkylation zone, passing said reactor effluent to a high pressure separator wherein said effluent is separated into a hydrogen-rich gaseous fraction and a liquid hydrocarbon fraction, recycling said hydrogen-rich gaseous fraction to said dealkylation zone, passing said liquid hydrocarbon fraction to a low pressure separator, removing light hydrocarbons, recycling one portion of the remaining liquid hydrocarbon fraction to said dealkylation zone, recycling a second portion of said liquid fraction to admix with said reactor effluent prior to entry into said high pressure separator, removing the remaining portion of said liquid hydrocarbon fraction, fractionating said latter portion, and recovering the desired benzene.

Other objects and embodiments referring to alternative catalytic compositions of matter and to alternative feed stocks of alkylaromatic hydrocarbons will be found in the following further detailed description of this invention.

As hereinbefore set forth the invention is concerned with a process for hydrodealkylating an alkyl substituted aromatic compound and preferably an alkyl substituted aromatic hydrocarbon in a catalytic type operation to prepare aromatic hydrocarbons which are the desired product. It has now been discovered that when this process is effected in the presence of a catalyst which contains a metal of Group IV of the Periodic Table and a metal of Group VI of the Periodic Table composited on a refractory oxide, the yield of desired product will be increased while at the same time the temperature under which the reaction will proceed is lower than is ordinarily utilized when using a catalyst consisting of a metal of Group VIB of the Periodic Table composited on a refractory oxide. This increased yield plus the lower operating temperature condition of the process will result in a more economical reaction and obtention of the desired aromatic product inasmuch as less heat with the attendant cost thereof will be required to effect the desired reaction. Examples of alkyl substituted aromatic hydrocarbons which may undergo hydrodealkylation according to the process of this invention and in the presence of the catalyst hereinafter described in greater detail will include toluene, m-xylene, o-xylene, p-xylene, ethylbenzene, o-diethylbenzene, m-diethylbenzene, p-diethylbenzene, etc., 1-methylnaphthalene, 2-methylnaphthalene, 1,2-dimethylnaphthalene, 1,3-dimethylnaphthalene, 1,4-dimethylnaphthalene, etc., 1-methylanthracene, 1,3-dimethylanthracene, 1-methylchrysene, 1-methylpyrene, etc.

The catalytic composition of matter in the presence of which the process of this invention is effected will comprise a soluble salt of a metal of Group IV of the Periodic Table such as, for example, tin chloride, titanium chloride, zirconium oxychloride, tin nitrate, tin sulfate, titanium nitrate, titanium sulfate, zirconium oxybromide, zirconium oxyiodide, etc., is coprecipitated with an alumina sol. When utilizing certain of the soluble salts of the type hereinabove set forth, such as the titanium, tin, etc., it is desirable to add an alkali salt such as, for example, potassium nitrate to the coprecipitation solution. Other alkali salts such as sodium nitrate, lithium nitrate, the hydroxides of alkali metals, etc., may also be used. The resultant composite is heated and aged and thereafter formed into the desired shape. One example of the desired shape comprises spheres, the preparation of which includes dropping the hydrogel composite into a bath. Following the formation of the desired spheres the base is aged, dried and calcined. Upon completion of the preparation of the base containing the metal of Group IV of the Periodic Table, said base is impregnated with a solution containing the desired metal of Group VIB of the Periodic Table such as chromium, molybdenum or tungsten. After impregnation with the solution containing the metal of Group VIB of the Perodic Table the resultant composite is dried and calcined and thereafter utilized as the catalytic composition of matter for the hydrodealkylation of the alkyl substituted aromatic compound.

The process of this invention in which the alkyl substituted aromatic hydrocarbon is subjected to hydrodealkylation in the presence of the catalytic composition of matter herein described is normally effected at temperatures ranging from about 1000° to about 1500° F. and at a pressure in the range of from about 300 to about 1000 or more pounds per square inch. Whereas, as hereinbefore set forth, the normal procedure is to effect the hydrodealkylation process at a temperature ranging from about 1250° to about 1350° F. it has now been found that the reaction will proceed at temperatures in the neighborhood of about 50° less than hereinbefore employed. While the process of this invention may be effected in either a batch type or continuous type operation it is preferred to utilize the latter method of effecting the process. An illustration of a continuous type operation is to pass the feed stock comprising an alkyl substituted aromatic hydrocarbon into a heater wherein said feed stock is heated to the desired inlet temperature and thereafter passed to a hydrodealkylation or reaction zone containing a catalytic composition of matter of the type set forth in this specification. In the hydrodealkylation zone the alkyl substituted aromatic hydrocarbon is dealkylated in the presence of hydrogen and the catalyst. The reactor effluent is continuously withdrawn from the reaction zone and passed to a high pressure separator.

In the high pressure separator or flash drum the reactor effluent is separated into two fractions, the first being a hydrogen-rich gaseous fraction which is withdrawn as overhead and after being condensed is recycled to the reaction zone.

The liquid hydrocarbon fraction is continuously withdrawn from the high pressure separator or flash drum and passed to a second separation zone which is maintained at considerably lower pressure than the first, that is, about atmospheirc pressure. In this low pressure separator or flash drum the light hydrocarbons which may still be dissolved in the liquid hydrocarbon fraction, that is, methane, ethane, propane and unreacted hydrogen, are continuously withdrawn as overhead and passed to a gas absorber. In addition to containing the light hydrocarbons the fraction which is withdrawn as overhead may also contain dissolved therein some unreacted alkylaromatic hydrocarbons as well as the desired aromatic hydrocarbons which have been prepared in the hydrodealkylation zone. These latter hydrocarbons are stripped from the fraction passing into the absorber and, are absorbed in the oil and recycled back to another zone wherein they are recovered. The light hydrocarbons which pass through the absorber oil are vented off and may be utilized as fuel for the heating up of the fresh feed. The liquid hydrocarbon fraction from this low pressure separator is also continuously withdrawn. Upon withdrawal from the low pressure separator a portion of the liquid hydrocarbon fraction is withdrawn for fractionation to recover the desired end product in further treatment such as clay treatment wherein impurities which might impair the acid-wash color test are removed and the desired product is sent to storage and any unreacted starting materials which may be present in this liquid hydrocarbon fraction are recovered and recycled to form a portion of the feed stock. The other portion from the liquid hydrocarbons which have been withdrawn from the low pressure separator is recycled and divided into two parts. One part of this recycle is charged to the hydrodealkylation zone near the outlet thereof, said portion acting as a quench for the effluent and lowering the temperature thereof, this step being taken to reduce any metallurgical problems which may arise in the outlet system. Inasmuch as the demethylation of alkylaromatic hydrocarbons such as toluene, the xylenes, the methylnaphthalenes, etc., is strongly exothermic the temperature must of necessity be controlled within a desired range in order to remove the large amount of reaction heat which might build up and have a tendency to destroy the desired product by hydrocracking the benzene or naphthalene. By recycling a portion of the liquid hydrocarbon fraction from the last flash drum to the hydrodealkylation zone this tendency is minimized due to the fact that the reaction temperature is controlled within the desired range hereinbefore set forth. The other portion of the liquid hydrocarbon fraction which is recycled is admixed with the reactor effluent subsequent to withdrawal from the hydrodealkylation zone and prior to entry into said high pressure separator or flash drum. By recycling a portion of the liquid hydrocarbon fraction from the low pressure separator to admix with the reactor effluent the light hydrocarbons of the type hereinbefore set forth (methane, ethane, propane, etc.) are absorbed in said liquid hydrocarbon fraction thereby permitting the hydrogen-rich gaseous fraction which is separated in the high pressure flash drum to be of a relatively high degree of purity, that is, over 50% (the degree of purity being defined as the mole ratio of hydrogen to hydrogen plus impurities). By utilizing a hydrogen stream possessing a relatively high degree of purity the possibility of catalyst deactivation in the hydrodealkylation zone due to the deposition of coke or other heavy carbonaceous material upon the catalytically active centers and surfaces of the catalyst is substantially reduced. By eliminating the deposition of coke on the catalyst or on the walls of the reactor and other pieces of apparatus the necessity for frequent shut-downs for decoking of the catalyst or changing the catalyst entirely will be avoided. It is also contemplated within the scope of this invention that the process may utilize three separate flash drums for separation of the hydrogen, light hydrocarbons and liquid hydrocarbon fractions rather than just two as hereinbefore described. In the event that three flash drums are used the high pressure separator or flash drum will be maintained at a pressure in the range of from about 500 to about 600 pounds per square inch. The hydrogen-rich gaseous fraction will be separated from the liquid hydrocarbon fraction in this separator, the hydrogen-rich gas fraction being recycled back to the dealkylation zone and/or if so desired to the hydrorefining zone. The liquid hydrocarbon fraction from the high pressure flash drum is withdrawn and charged to an intermediate separator or flash drum which is maintained at a pressure in the range of from about 50 to about 150 pounds per square inch. Any light hydrocarbons such as methane, ethane or propane which are flashed off from this separator are taken overhead and passed to a gas absorber. The liquid hydrocarbon fraction from the intermediate pressure separator is then charged to a low pressure separator or flash drum which is maintained at approximately atmospheric pressure. Any light hydrocarbons which may still be entrained in the liquid hydrocarbon fraction are withdrawn and passed to the gas absorber in combination with the light hydrocarbons and entrained aromatic or alkylaromatic hydrocarbons, if any, which have flashed off overhead from the intermediate pressure separator and low pressure separator. The light hydrocarbons are treated as hereinbefore set forth, that is, by being withdrawn from the absorber and passed to storage for utilization as fuel while the aromatic hydrocarbons and alkylaromatic hydrocarbons are passed to a stripper and recovered. The liquid hydrocarbon fraction from the low pressure separator is withdrawn and treated in a manner similar to that hereinbefore set forth, that is, one portion going to the clay treater for treatment, subsequent fractionation and recovery of the desired product, the second portion being recycled for use as a quench for the reactor effluent prior to the withdrawal of the effluent from the dealkylation zone while the third portion is admixed with the reactor effluent subsequent to withdrawal from the dealkylation zone and prior to entry into the high pressure separator.

The following examples are given to illustrate the process of the present invention which, however, are not intended to limit the generally broad scope of the present invention in strict accordance therewith.

EXAMPLE I

In this experiment 1500 cc. of alumina sol, 137 cc. of concentrated hydrochloric acid and 60 cc. of water were mixed. The alumina Group IV metals solution was then prepared by admixing 565 cc. of the alumina sol blend with a solution containing 21.5 g. of stannic chloride and 46.7 g. of zirconium oxychloride which had been mixed wth sufficient water to make 75 cc. of solution. The solution was heat aged overnight at a temperature of about 95° C. and thereafter chilled in a wet ice bath. The chilled solution (640 cc.) was added to 640 cc. of chilled hexamethylenetetramine and dropped to form spheres. The spheres were aged for 16 hours at a temperature of about 95° C. in oil followed by 2 hours in a 2% ammonia solution. The spheres were then water washed for 12 hours at 95° C. in an ammoniated solution following which the spheres were dried for 2 hours at 200° C. and calcined for 3 hours at 650° C. The base had an apparent bulk density of 0.526.

The thus prepared base (120 g.) was impregnated with 250 cc. of a solution containing 30.0 g. of chromia and the resultant catalyst composite was then calcined for 2 hours at 730° C., the finished deposit having an apparent bulk density of 0.665.

EXAMPLE II

In this example another catalyst is prepared in a manner similar to that set forth in Example I above by coprecipitating an alumina sol with sufficient titania and impregnation with potassium nitrate so that the finished base conained 5% titania and 0.75% potassium. The coprecipitated base was treated in a manner similar to that set forth in Example I above that is, by heating, addition of methylenetetramine, sphere formation, aging, water washing, drying and calcination. The base was then impregnated with a potassium nitrate solution, calcined, and then the alkalized base was impregnated with a sufficient chromia solution so that the finished catalyst composite contained 16% chromia.

EXAMPLE III

In this example a catalyst composite was prepared by coprecipitating titania and tin oxide with alumina and thereafter treating the resulting solution in a manner similar to that set forth in Example I above, the finished base containing 2% titania and 5% tin oxide. The base was impregnated with sufficient chromia solution so that after calcination the finished catalyst composite contained 16% chromia.

EXAMPLE IV

Toluene was subjected to hydrodealkylation to form benzene in the presence of hydrodealkylation catalyst prepared according to Examples I to III above. In addition a standard catalyst which contained only chromia impregnated on an alumina base was also utilized. The hydrodealkylation was effected at a pressure of 500 pounds per square inch, a liquid hourly space velocity of 2.0 and a hydrogen to hydrocarbon mole ratio of 8:1. The results of these tests are set forth in Table I below.

Table I

| Catalyst Description | Benzene @ 1,200° F. | Yield @ 1,250° F. |
| --- | --- | --- |
| Catalyst containing only chromia impregnated on alumina | 50 | 56 |
| Catalyst of Example I | 47.1 | 63.2 |
| Catalyst of Example II | 51 | 65 |
| Catalyst of Example III | 49.7 | 64 |

It is apparent that the yield of the desired product, namely, benzene at temperatures of 1200° F. and 1250° F. when utilizing a catalyst composite which has been prepared by commingling a compound containing a metal of Group IV of the Periodic Table with a refractory oxide to form a catalyst base thereafter impregnating said base with an oxide of a metal of Group VIB of the Periodic Table is greater than the yield obtained when utilizing a catalyst composite containing only a metal of Group VI of the Periodic Table impregnated on a refractory oxide base.

We claim as our invention:

1. A process which comprises hydrodealkylating an alkyaromatic compound in the presence of hydrogen and a catalyst prepared by coprecipitating alumina and at least one oxide of a metal selected from the group consisting of tin, titanium and zirconium, calcining the resultant precipitate and thereafter compositing with the calcined precipitate at least one oxide of a meal selected from the group consisting of chromium, molybdenum and tungsten.

2. A process for the hydrodealkylation of an alkyaromatic hydrocarbon which comprises contacting said hydrocarbon together with hydrogen at a temperature of from about 1000° to about 1500° F. and a pressure of from about 300 to about 1000 pounds per square inch with a catalyst prepared by coprecipitating alumina and at least one oxide of a metal selected from the group consisting of tin, titanium and zirconium, calcining the resultant precipitate and thereafter compositing with the calcined precipitate at least one oxide of a metal selected from the group consisting of chromium, molybdenum and tungsten.

3. The process of claim 2 further characterized in that the first-mentioned metal is tin.

4. The process of claim 2 further characterized in that the first-mentioned metal is titanium.

5. The process of claim 2 further characterized in that the first-mentioned metal is zirconium.

6. The process of claim 2 further characterized in that said hydrocarbon is toluene.

7. A process for the production of benzene which comprises hydrodealkylating toluene at a temperature of from about 1000° to about 1500° F. and a pressure of from about 300 to about 1000 pounds per square inch in the presence of hydrogen and a catalyst prepared by coprecipitating alumina and stannic oxide, calcining the resultant precipitate and thereafter compositing chromia with the calcined precipitate.

References Cited by the Examiner

UNITED STATES PATENTS

| | | | |
|---|---|---|---|
| 2,396,761 | 3/46 | Tilton | 260—672 |
| 2,629,684 | 2/53 | Leffer | 260—672 |
| 2,700,638 | 1/55 | Friedman | 260—672 |
| 2,734,929 | 2/56 | Doumani | 260—672 |
| 2,750,432 | 6/56 | Coonradt et al. | 260—672 |
| 2,773,917 | 12/56 | Coonradt et al. | 260—672 |
| 2,774,801 | 12/56 | Coonradt et al. | 260—672 |
| 2,786,876 | 3/57 | Coonradt ea al. | 260—672 |

ALPHONSO D. SULLIVAN, *Primary Examiner.*